United States Patent [19]
Hariharan et al.

[11] Patent Number: 5,489,984
[45] Date of Patent: Feb. 6, 1996

[54] DIFFERENTIAL RANGING MEASUREMENT SYSTEM AND METHOD UTILIZING ULTRASHORT PULSES

[75] Inventors: Anand Hariharan; Donald J. Harter, both of Ann Arbor, Mich.

[73] Assignee: Imra America, Inc., Ann Arbor, Mich.

[21] Appl. No.: 400,525

[22] Filed: Mar. 7, 1995

Related U.S. Application Data

[63] Continuation of Ser. No. 221,790, Apr. 1, 1994, abandoned.

[51] Int. Cl.$^6$ .................................................... G01B 9/02
[52] U.S. Cl. ........................ 356/360; 356/345; 356/358; 356/4.09
[58] Field of Search ........................ 356/4.5, 345, 349, 356/358, 359, 360

[56] References Cited

U.S. PATENT DOCUMENTS

| | | |
|---|---|---|
| 3,669,541 | 6/1972 | Duguay . |
| 4,097,148 | 6/1978 | Fry . |
| 4,606,639 | 8/1986 | Mottier et al. . |
| 4,619,529 | 10/1986 | Iuchi et al. . |
| 4,708,481 | 11/1987 | Mori et al. . |
| 4,729,653 | 3/1988 | Kobayashi . |
| 4,767,197 | 8/1988 | Yeh . |
| 4,767,210 | 8/1988 | Kashyap . |
| 4,792,230 | 12/1988 | Naganuma et al. ............ 356/345 |
| 4,830,486 | 5/1989 | Goodwin . |
| 4,886,363 | 12/1989 | Jungquist . |
| 4,973,160 | 11/1990 | Takiguchi et al. . |
| 4,978,219 | 12/1990 | Bessho . |
| 5,037,206 | 8/1991 | Etzkorn et al. . |
| 5,166,751 | 11/1992 | Massig . |
| 5,170,217 | 12/1992 | Nishimoto et al. . |
| 5,189,489 | 2/1993 | Brunfeld . |
| 5,299,170 | 3/1994 | Shibata et al. ............ 356/345 |
| 5,359,410 | 10/1994 | Diels et al. ............ 356/345 |

OTHER PUBLICATIONS

"Femtosecond Transillumination Optical Coherence Tomography", Hee et al., Optics Letters, vol. 18, No. 12, Jun. 15, 1993, pp. 950–952.

"Imaging with Femtosecond Pulses", Yan et al., Applied Optics, vol. 31, No. 32, Nov. 10, 1992, pp. 6869–6873.

"Ultrashort Light Pulses, Picosecond Techniques and Applications", Ippen, E. P. and Shank, C. V., Springer-Verlag, Berlin, Heidelberg New York, 1977.

"Intense Light Bursts In the Stimulated Raman Effect", Maier et al., Physical Review Letters, vol. 17, No. 26, Dec. 26, 1966, pp. 1275–1277.

"Dynamic Spectroscopy and Subpicosecond Pulse Compression", Ippen et al., Applied Physics Letters, vol. 27, No. 9, Nov. 1975, pp. 488–490.

Applied Physcis Letters, vol. 10, Jan. 1, 1967, "Measurement of Picosecond Laser Pulse Widths", J. A. Armstrong, pp. 16–19.

(List continued on next page.)

Primary Examiner—Samuel A. Turner
Assistant Examiner—Robert Kim
Attorney, Agent, or Firm—Sughrue, Mion, Zinn, Macpeak & Seas; Richard C. Turner

[57] ABSTRACT

An optical correlator is disclosed that, in combination with an ultrafast optical pulsed source, can be used for estimating the differential position of remote objects with submicron precision, as opposed to measuring the absolute distance. The system includes an ultrafast pulsed laser source feeding into an amplitude-division device, with each amplitude component leading to an entity for launching pulsed radiation at the target, along with an entity for collecting the radiation scattered or reflected off the surface of the object, a nonlinear device for time-gating the collected signal with the amplitude-divided source, and a detection device for observing the time-gated signal. The device has remarkable spatial resolution and sensitivity. Applications of the technique to the measurement of torque, angular deformation, and two- and three-dimensional surface profilometry are presented.

26 Claims, 10 Drawing Sheets

OTHER PUBLICATIONS

IEEE Journal of Quantum Electronics, vol. QE–16, No. 9, Sep. 1980, "CW Autocorrelation Measurements of Picosecond Laser Pulses", Kenneth L. Sala et al, pp. 990–996.

Optics Letters, vol. 6, No. 9, Sep. 1981, "Subpicosecond–Time Domain Reflectometry", Joel J. Fontaine et al, pp. 405–407.

Optics Letters, vol. 18, No. 7, Apr. 1, 1993, "400–Hz Mechanical Scanning Optical Delay Line" K. F. Kwong, et al, pp. 558–560.

Optics Letters, vol. 16, No. 13, Jul. 1, 1991, "Imaging Objects Hidden in Highly Scattering Media Using Femtosecond Second–Harmonic–Generation Cross–Correlation Time Gating", K. M. Yoo et al, pp. 1019–1021.

Optics Letters, vol. 18, No. 21, Nov. 1, 1993, "In Vivo Retinal Imaging by Optical Coherence Tomography", E. A. Swanson et al., pp. 1864–1866.

Journal of Applied Physics, vol. 62, No. 5, Sep. 1, 1987, "Optical, Mechanica, and Thermal Properties of Barium Borate", D. Eimerl et al, pp. 1968–1983.

Revue Phys. Appl., 22 Dec. 1987, pp. 1605–1611, J. C. Diels, et al, "Ultrafast Diagnostics" Optics and Lasers in Engineering 4 (1983) pp. 145–165 J. C. Diels et al, "Imaging With Short Optical Pulses".

Applied Optics, vol. 24, No. 9, 1 May 1985, "Control and Measurement of Ultrashort Pulse Shapes (In Amplitude and Phase) with Femtosecond Accuracy", J. C. Diels, et al., pp. 1270–1282.

"Measurement of Ultrashort Optical Pulses with $\beta$–$BaB_2O_4$", publ. 7 Dec. 1987, K. L. Cheng et al.

Optics Letters, vol. 11, No. 3, Mar. 1986, "Femtosecond Optical Ranging in Biological Systems" J. G. Fujimoto, et al., pp. 150–152.

DIFFERENTIAL RANGING MEASUREMENT SYSTEM AND METHOD UTILIZING ULTRASHORT PULSES

This is a continuation of application Ser. No. 08/221,790 filed Apr. 1, 1994 now abandoned.

BACKGROUND OF THE INVENTION

1. Field of the Invention

The present invention relates to a differential ranging system and method using extremely short pulse width laser beams to measure a distance to or other characteristic of an object.

2. Description of the Related Art

Ultrafast laser oscillators are presently known which are capable of generating pulsewidths on the order of tens of femtoseconds with nanojoule-level pulse energies, at repetition rates as high as 100 Mhz. With this development have come attendant correlation techniques for performing diagnostics on the ultrashort laser pulses. See, e.g., E. P. Ippen and C. V. Shank in *Ultrashort Light Pulses,* ed. S. L. Shapiro; J. A. Armstrong; J. Appl. Phys., 38 2231 (1967); M. Maier, W. Kaiser and J. A. Giordmaine; Phys. Rev. Lett., 17 1275 (1966); E. P. Ippemn and C. V. Shank; Appl. Phys. Lett., 27 488 (1975); K. L. Sala, G. A. Kenney-Wallace and G. E. Hall; IEEE J. Quantum Electron. 16(9) 990 (1980); J. J. Fontaine, J.-C. Diels, C-Y Wang and H. Sallaba; Opt. Lett., 6(9) 405 (1981)). In these references, it is of course the pulse itself that is the object of scrutiny.

As the field of femtosecond lasers is itself relatively new, the first applications of such lasers are just now being developed. It is one of the objects of the present invention to apply femtosecond laser technology and associated correlation techniques to the field of distance measurement (differential ranging), and related disciplines.

A variety of techniques exist in the prior art for the purpose of ranging between an observer and a remote object, or between two remote objects. Pulsed microwave techniques have provided the means to achieve precision to within a few centimeters over significant distances. Nanosecond pulsed laser radar techniques have provided slightly better distance resolution, down to a few millimeters. Diels et al, in Opt. & Laser Eng., 4 145 (1983), demonstrates the feasibility of using subpicosecond optical pulses to perform ranging with optical time-domain reflectometry. Others have applied this and similar techniques to the problem of imaging objects located within turbid or highly scattering media.

SUMMARY OF THE INVENTION

It is an object of the present invention to produce a distance-ranging device based on an ultrashort pulse autocorrelation technique. According to the invention, a device utilizing ultrashort optical pulses is used to measure the distance of one test object with respect to another test object from a location remote with respect to both the objects. This function is performed as follows. The pulse from the ultrashort laser is split into two amplitude components. One of these components acts as a time reference, and is subjected to a repetitive, well-determined optical path delay.

The other component is further split into as many components as there are objects to be observed. Each component is created at the same instant of time, or created such that the time-delays between the creation of each component can be precisely time-indexed with respect to the others. Each component is launched at the test object, and the returned signal is collected and time-gated with respect to the time reference beam. The time-gating process yields an autocorrelation spike from each component; the delay in time-of-flight between each component appears as a delay in time-gating each component. Since the pulsewidth of the source is very precisely known, each of the time-delays can be calibrated against this pulsewidth.

The pulsewidth measurement can be made concurrently with distance ranging, without the necessity of performing a separate measurement. The delay in time of flight between the optical paths of interest being ranged provides a precise measure of the differential separation between the objects being investigated. The time-gating is performed by second-harmonic generation in a nonlinear crystal, and the output signal is detected in a conventional photo detection device, such as a photo multiplier. Since the nonlinear frequency-doubling process is a function of the product of the intensities of the test and reference signals, the presence of a strong (in terms of intensity) reference beam offsets the loss in signal due to a weak beam from the object(s). Therefore, the system has a high sensitivity. The use of ultrashort pulses produces an extremely short duty-cycle for the time-gating process, ensuring that spurious signals are rejected.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, in which.

DETAILED DESCRIPTION OF THE PREFERRED EMBODIMENTS

The purpose of a ranging device is to determine the distance between a fixed point in space and a test object with high precision and accuracy. In distance measurements, the ultranarrow pulsewidths from a laser source can be effectively utilized to achieve spatial resolution down to a fraction of the pulsewidth, with the time of flight of the distance to be ranged determined using time-gating.

Figure 1:
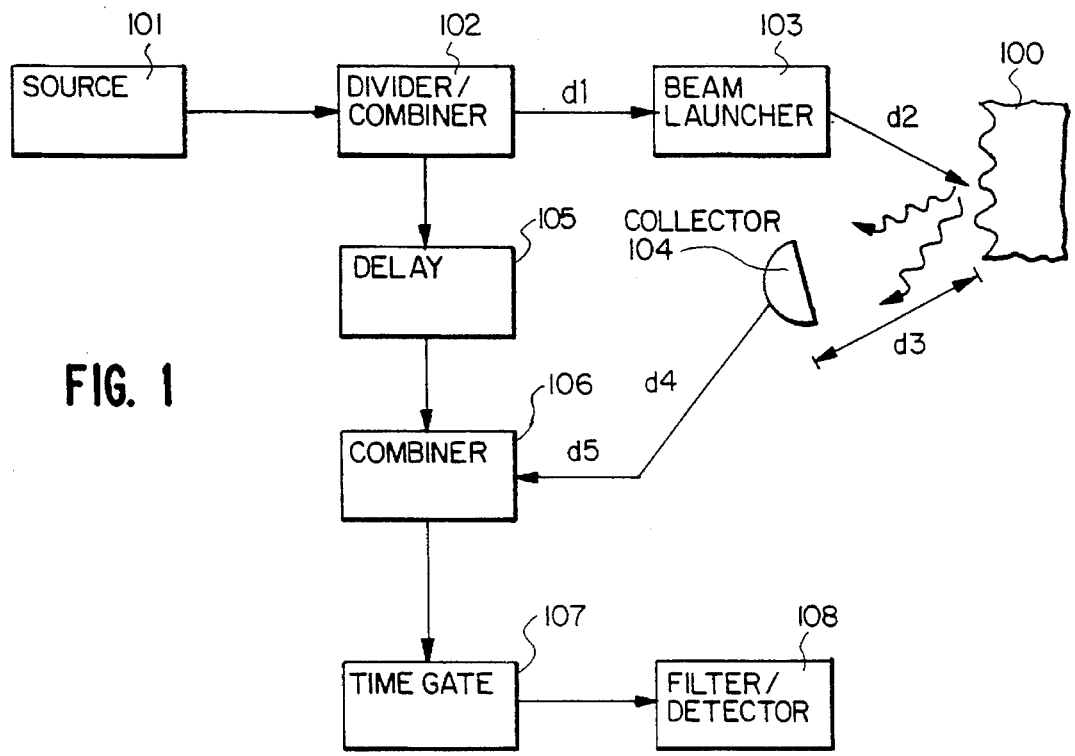
FIG. 1 shows a schematic of a conventional autocorrelator with a single probe arm with the transmit and receive functions residing in separate arms.
Figure 2:
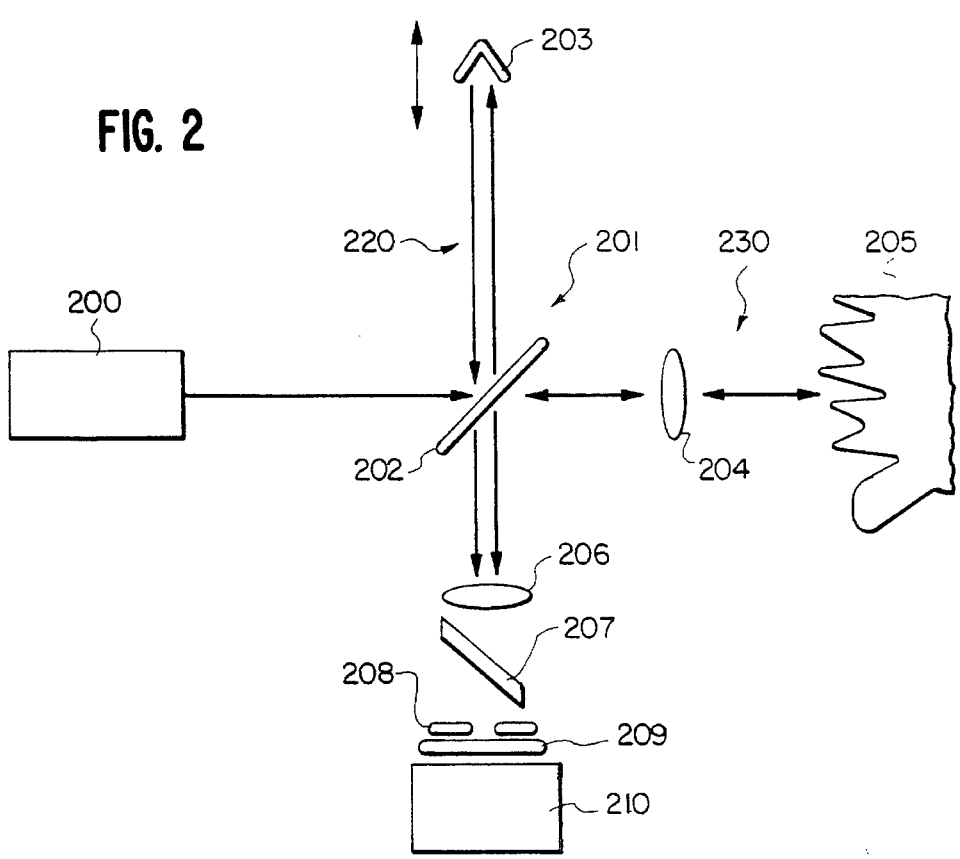
FIG. 2 illustrates implementation details of a autocorrelator.
Figure 3:
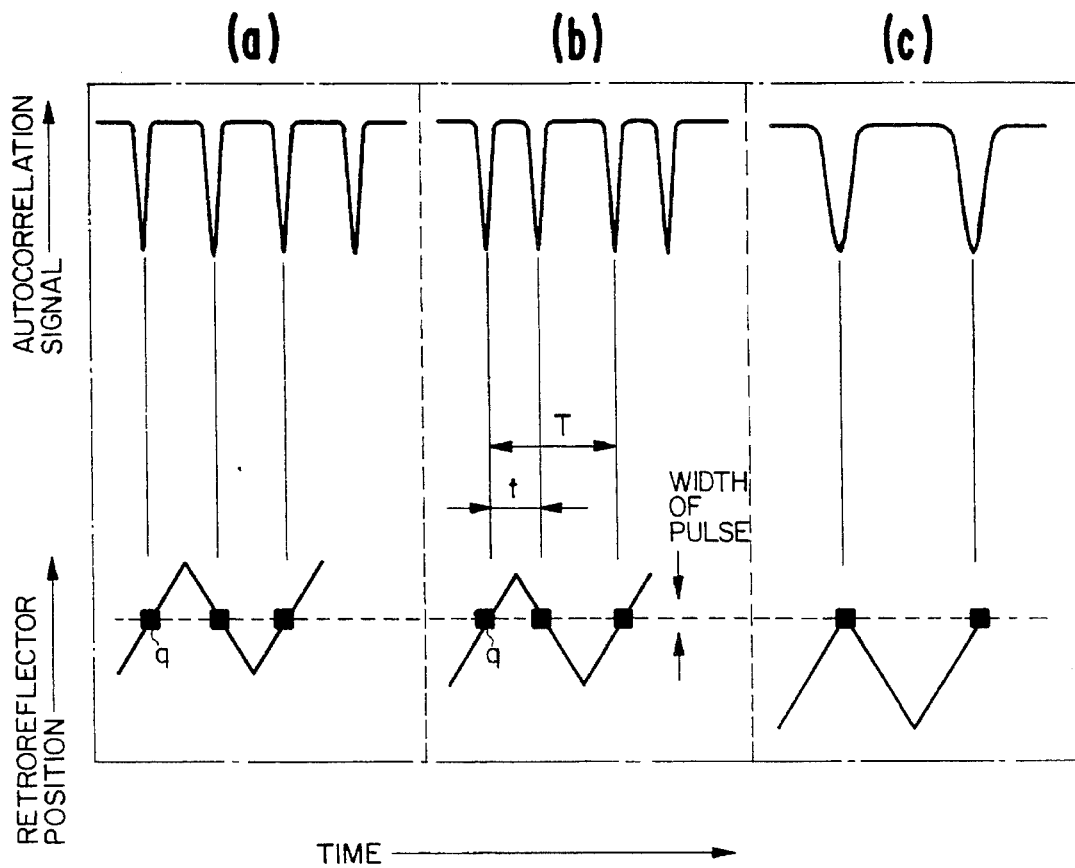
FIG. 3 shows the generation of the autocorrelation trace in a system using a moving reference arm.

A conceptual representation of a laser ranging system using an autocorrelation technique is shown in FIG. 1. This system, as well as the implementation thereof shown in FIGS. 2 and 3, is the subject of commonly assigned co-pending application Ser. No. filed Apr. 1, 1994, which is hereby incorporated by reference herein. This system will be described in detail as the concept as well as the physical elements employed in implementation are the same as in the invention. Here, electromagnetic radiation generated by source 101 and split into reference and test pulses at divider/combiner 102 is transmitted at 103 to thereby traverse an optical path d1+d2+d3+d4+d5 as it emerges from beam transmitter 103, reflects/scatters at the test object 100, returns through collector 104 and recombines with the split-off reference beam at combiner 106. The time delay between amplitude division at divider 102 and recombination/time-gating, at combiner 106 and non-linear time gate 107, when accurately known, becomes a gauge of the distance Δd that can be calculated from the velocity of the electromagnetic radiation along the test optical path. When the time delay (imposed by 105) is exactly equal to the time of flight of the pulse in the optical ranging path, the pulses arriving at the amplitude combiner are coincident in time. Therefore, the time gate switches on, and a signal is recorded by the detection device 108, which may include integral optical filters. At all other times, the delayed pulse is not coincident with the signal pulse, and the time gate stays off and there is no output at the detection device. The signal recorded over many pulses yields the autocorrelation function of the pulse. The main quantity of interest, of course, is the time delay between the signal pulse and the reference pulse.

Referring to FIGS. 1 and 2, the system includes a source 101 (200 in FIG. 2) of extremely short pulses of electromagnetic energy, which is preferably an ultrafast pulsed laser oscillator. The source may be selected from among many different known types; one preferred source is a modelocked visible-range titanium-doped sapphire laser which is capable of producing transform-limited pulses of 60 fs (fwhm) duration, at a 100 Mhz repetition rate, and at a wavelength of 800 nm. The laser output is polarized horizontally and has an average power of about 100 Mw. Other sources of femtosecond pulses that can be used in the invention include the following: (a) Kerr lens modelocked lasers, (b) RPM, APM lasers, (c) polarization-sensitive modelocked fiber lasers, (d) actively modelocked lasers, (e) fiber, fiber-grating and fiber-prism pulse compressors that enhance bandwidth of ≈ps pulsed sources, (f) terahertz dipole antennas, (g) continuum-generated sources, (h) synchrotron sources, (i) partially coherent x-ray sources, j) microwave and RF oscillators and (k) active or passive electro-optic waveguide switches.

The output wavelength of the source may be relatively freely selected, however, the ultimate pulse width is determined by the source wavelength. The desirable output wavelength is also determined by such factors as the absorption and the temporal dispersion of the pulses in the media through which the EM energy is bound to travel. The pulses need not be transform-limited: i.e., the product of the pulsewidth and its energy bandwidth need not be a minimum as determined by Heisenberg's Uncertainty Principle. However, the magnitude and functional form of the frequency sweep present on a non-transform limited pulse has an effect on the resolution of the distance being ranged, and on the signal-to-noise ratio of the system. Resolution and/or signal-to-noise decrease with increasing frequency sweeps on the pulse.

The amplitude division and/or recombination elements 102 and 106 can be realized in a variety of ways: polarizing plate beamsplitters, polarizing cube beamsplitters, polarizing prisms such as Wollaston prisms or Glan prisms, −3 dB fiber couplers, etc. In FIG. 2 described below, the functions of both elements are combined in nonpolarizing beamsplitter 202.

The variable time delay element 105 is typically an optical delay line and is realizable in a variety of ways. Directly, the beam can be retroreflected off a retroreflecting device (203 in FIG. 2) such as a cube, or a right angle prism, so as to define a reference optical path. The retroreflecting device can be mounted on a translation stage that is driven repetitively by a triangular or other waveform. Mechanical actuators for effecting the translation could consist of electromechanical or piezoelectric transducer elements. This causes the optical path length to oscillate around a mean value. The same purpose is served by glass plates rotating in and out of the path of the reference optical beam. An optical fiber with a bend replacing the retroreflecting cube/mirror can also serve as a delay line. Another usable implementation of the delay line, as disclosed by K. F. Kwong et al; Opt. Lett., 18(7) 558 (1993)) consists of a diffraction grating and a mirror undergoing angular dither.

For obtaining the autocorrelation trace, the optical path of the reference arm is repetitively oscillated; for tracking the test arm on a real-time basis, a servo system is used to provide feedback to the translation device, which then adjusts the reference optical path length to maximize the correlation signal.

An implementation of the system schematically shown in FIG. 1 appears in FIG. 2. The autocorrelator includes variable reference and test arms 220 and 230, and a nonpolarizing thin beamsplitter 202 of 0.5 mm thickness that splits the laser beam (about 100 mW average power) into two equal amplitude components perpendicular to each other. Light in the reference arm 220 is retro-reflected off a right-angle BK-7 prism 203 mounted on a mechanical actuator with a rated maximum travel of 4 cm. An audio speaker voice coil can serve as a suitable actuator. The prism returns the incident beam and at the same time displaces it laterally by up to 10 mm. This displacement is rendered variable by mounting the entire actuator assembly on a translation stage (not shown). A sinusoidal or triangular voltage of about 20 Hz is applied across the actuator, resulting in an optical path length excursion of about 2 cm, whereby the optical path of the reference arm varies sinusoidally around some mean value by about 4 cm.

The other half of the laser beam passes through the beamsplitter and is focused onto the test surface 205 using a beam launcher/collector in the form of a convex lens (f=20 cm) 204. Real test surfaces cannot always be highly reflecting, and a large amount of scatter and therefore attenuation is expected. For example, a Lambertian scattering surface would take a beam confined in a cone angle of 2θ and scatter it out into almost 2π steradian, causing more than an order of magnitude loss in signal. A relatively small focal length lens would minimize this loss, however, the selection of a too small focal length would result in a tiny confocal parameter and therefore a small range along the optic axis over which the beam remains tightly focused. Considering the ultimate aim of measuring reasonably large changes in the position of the surface with respect to the observer, and the need for the object to be held in focus over the entire range of its position, a compromise must be struck between collection efficiency and depth of focus.

The returns from the two arms 220, 230 are rendered parallel to each other due to recombination in the beamsplitter 202, with a lateral displacement between the beams. Thereafter they are focused by a short-focal length lens (f=3 to 10 cm) 206 and directed into the time-gate device 207 which here may take the form of a nonlinear frequency doubling crystal as described in detail below. In effect, the lenses 204 and 206 constitute an imaging system designed to generate a small focal spot in the crystal from the scattered signal.

In conventional reflectometry, the presence of scatter and absorption in the medium present between the ranged object and the ranging device leads to spurious signals and a degradation in performance. Time gating on the subpicosecond time scale eliminates such spurious signal from scatter, since the time gate blocks out the background signal when the gating pulse is not present. This is a considerable benefit for a practical distance ranging device, and becomes especially prominent at signal sampling intervals (i.e., pulse repetition rates) that are typically six or more orders of magnitude larger than the pulsewidth. Also, due to the nonlinear nature of the time gating, the technique is extremely sensitive to signal. The time gated signal is not only proportional to the signal I(t) returned from the test object, but to the correlation function $\int I(t)*I'(t+\tau)d\tau$, which is a time-correlation product of the test signal and the timegating pulse, rather than being an independent function of one or the other. In effect, a strong reference pulse can timegate the entire photon energy of a weak pulse. The timegating pulse is made many orders of magnitude more intense than the returned signal, to ensure high sensitivity. Due to this sensitivity, the scatter from the test surface is sufficient to obtain a time gated signal. This obviates the need for specially coated or treated reflective surfaces on the target 205 to ensure high reflectivity. Surface roughness and uncleanness are tolerated.

A preferred embodiment of the nonlinear time gate according to this system and that of the invention is a second harmonic generating crystal. In this device, the nonlinear upconverter accepts two photons of the same frequency as input. The signal due to generation of the second harmonic is proportional to $$I(t)I'(t+\tau)\frac{\sin^2(\Delta k*L/2)}{(\Delta k*L/2)},$$

where $\Delta k$ is the wave vector mismatch between the two input signal beams, L is the interaction length, and I(t) are the intensity envelope functions of the pulse.

The nonlinear frequency doubling crystal preferred according to the invention is comprised of a 1.0 mm crystal of beta-barium borate (BBO). This particular crystal was chosen for its high doubling efficiency, large angle-bandwidth, relatively high damage threshold, transparency to UV and low pulse broadening due to group velocity dispersion. The BBO crystal is cut at 28 degrees with respect to the c-axis and 90 degrees with respect to the a-axis. The orientation of the crystal both along the optical axis and perpendicular to it is arranged to maximize second-harmonic signal generation. Rotation of the crystal along an axis perpendicular to the crystal and lying in a plane containing both the input beams optimizes the orientation of the crystal with respect to the polarization of the input beams. Due to the phase matching conditions discussed below, the second-harmonic signal emerges along the bisector of the angle subtended by the two beams incident on the crystal. In the crystal, a fraction of the input beam of 800 nm is frequency doubled to 400 nm. BBO is an intrinsically birefringent material: in the crystal there is only one unique direction with respect to the optic axis along which the phase velocity of the two fundamental beams is equal to that for the frequency doubled beam. This orientation condition has to be satisfied if the intensity of blue (frequency doubled) light is to grow along the length of the crystal. Along any other axis, the refractive index mismatch will cause a phase error to appear in the blue beam, and photons generated at any given point will interfere destructively with those generated at a previous point, and diminish. The condition for phase-matching of the three beams is:

$$\frac{c}{n_\omega(+\theta_1)}=\frac{c}{n_\omega(-\theta_1)}=\frac{c}{n_{2\omega}(0)}$$

where $$\frac{c}{n_\omega(\pm\theta_1)}$$

is the speed of light in the crystal at the fundamental frequency and at the angles $\pm\theta_1$, $$\frac{c}{n_{2\omega}(0)}$$

is the speed of light in the crystal at the doubled frequency at the angle intersecting $\pm\theta_1$.

An aperture or iris is used to select this beam from other extraneous light. In particular, it should be noted that a certain amount of second-harmonic light is also generated collinear to each of the beams incident upon the crystal. These are carefully rejected with the aperture. The shorter the focal length of the lens before the crystal, the larger the separation of the collinear frequency-doubled light from the noncollinear signal of interest. Therefore, a shorter focal length lens is preferred as long as the two beams still overlap the length of the crystal. Reducing the signal from the collinear components is important since this is a source of noise on the autocorrelation signal itself. As noted above, in a preferred embodiment, the peripheral blue spots accompanying the central beam are eliminated with an iris 208, and the central beam is filtered through a colored glass filter BG23, 209 to reject any fundamental beam components. The filtered beam is then detected in photomultiplier (PMT) 210. The photomultiplier may be a general purpose device, not necessarily low-noise, with a finite rise time. For display purposes the PMT output signal may be directly monitored with a digitizing oscilloscope and a time-interval counter. The signal line is terminated in 1 MΩ.

If the two beams from the reference and test arms were to be made perfectly collinear rather than parallel, the autocorrelator forms an interferometric system giving rise to a rapidly oscillating "carrier frequency" modulated by a slowly varying envelope function. In this mode the resolution possible is 1/50 of the wavelength of the fundamental (~800/50 nm). As an alternative to the parallel beam arrangement disclosed above, this interferometric system can be adopted, with the resulting higher resolution, when needed for a particular application. However, as interferometric measurements have system tolerances too strict for most applications, (i.e., as the interferometric system is not particularly robust), this arrangement is not the preferred mode of measurement according to the invention. Furthermore, as the collinear beams of an interferometric system give rise to an autocorrelation peak riding on a large background DC signal, the autocorrelation is obscured, and detection and measurement systems must be made increasingly discriminating as a result.

Therefore, in the preferred mode of the invention, the beams are made to enter the crystal noncollinearly, focusing and overlapping in the crystal. When the arm lengths are perfectly matched, three spots of blue (frequency doubled) light are observed emerging from the crystal: the central spot contains the desired intensity autocorrelation: the peripheral spots are therefore masked as discussed above.

Most of the features of the system as implemented above are compatible with harsh environments. Since there is no requirement for interferometric alignment of any component, it is immune to vibration, shock and thermal stress. Alignment is simple and intuitive, and the data is conveniently accessible in a usable format.

Referring now to FIG. 3, the generation of the autocorrelation trace and its behavior due to an oscillating reference arm is presented. In FIG. 3, the vertical axis represents the position of the retroreflector 203 in terms of the absolute length of the reference arm, whereas the horizontal axis corresponds to time. Three situations, (a) (b) and (c) have been shown, corresponding to three different lengths of the test arm (i.e., three different positions of the test object). The lower trace corresponds to the position of the retroreflector in time, and is triangular since the drive voltage to the electromechanical actuator (e.g., a voice coil) is triangular. The dotted line indicates the position of the test arm relative to the reference arm. In (a), both the arms are exactly equal. The square marks labeled "q" on the sine wave are highly exaggerated markers for the points in time over which the optical lengths of the two arms are exactly equal, and thus where a reference pulse overlaps with a signal pulse reflected from the object 205. Each "square" gives rise to a spike in the PMT output signal: this is the desired autocorrelation. The vertical length of the squares in the graph represents the laser pulsewidth. A 100 fs pulse occupies about 30 microns worth of linear space. The actuator travel is 2 cm, and therefore the entire oscillation amplitude of the sine wave in the figure is 2 cm. Thus, the overlap time of the pulses is three orders of magnitude smaller than the time required for the excursion of the actuator.

This is the genesis of the autocorrelation trace in (a). As the test object moves, say, farther away from the device, the dotted line moves to a new relative position on the sine wave as in (b). The squares shift accordingly, yielding the autocorrelation trace (b). Even though "t", the separation between adjacent autocorrelation peaks, changes, the time "T", the separation between every other peak, remains constant. This is because "T" reflects the drive frequency of the actuator, which remains constant. Upon taking the test object even further, the two adjacent autocorrelation peaks coalesce as in (c), and ultimately disappear, since there is no longer any overlap between test and reference pulses. The relationship between "t" on the autocorrelation trace and the actual length of the test arm is kept linear by using a triangular waveform to drive the actuator. Increasing the excursion of the reference arm will increase the limits of the ranging, which can have obvious advantages.

With a 100 MHz repetition rate of the laser source, the signal received at the PMT is an average over thousands of laser pulses rather than due to a single pulse. This is because at a 20 Hz repetition rate, the retroreflector travels 2 cm over 25 ms, i.e., 30 microns in 24 μs. With one pulse coming from the laser every 10 ns, 2400 laser pulses constitute the 24 μs overlap time. Stated differently, 2400 laser pulses will be emitted during the period of time it takes the retroreflector to move the physical distance corresponding to one laser pulse. Decreasing the repetition rate of the actuator will increase signal-to-noise, since a larger number of laser pulses would be averaged over. This would also increase overall acquisition time, and therefore affect overall system response to changes in the position of the test object. The detection limit achieved by the inventors is 10 photons per pulse, and a noise-equivalent-power of the order of 1 $pw/(Hz)^{1/2}$ has been measured.

The difference between the ultrashort pulse ranging scheme described in detail above and the differential ranging technique of the invention is as follows. The signal measured by the differential correlator is proportional to the difference between the separation of the observer from the first object on the one hand, and that of the observer from the second object on the other. Rather than measuring the optical paths of the two individual distances and subtracting one from the other, the actual difference is directly measured.

The optical path is calibrated against the pulsewidth of the laser source. If the laser pulsewidth is accurately known, the differential distance can be calculated. Therefore the absolute optical delay of the reference arm need not be calibrated.

Figure 4:
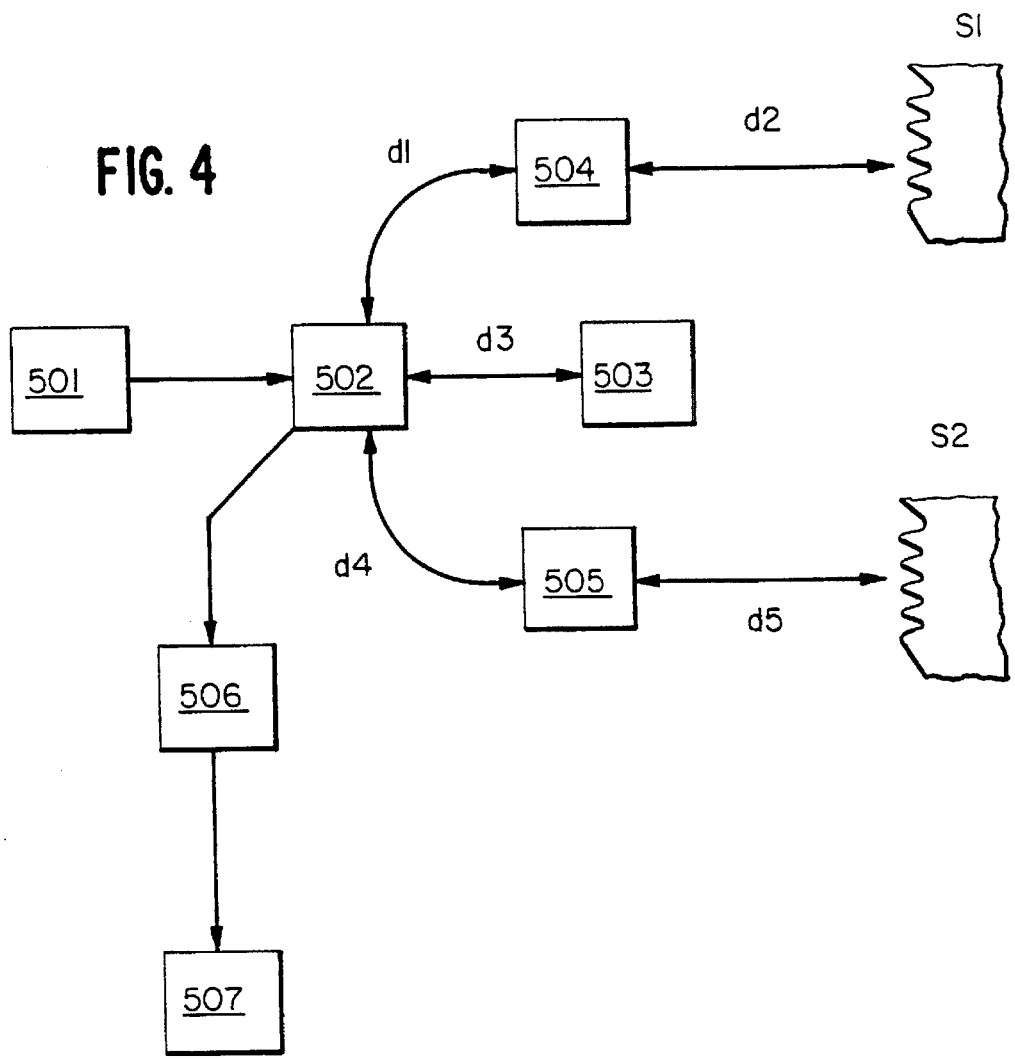
FIG. 4 is a conceptual schematic of a general differential ranging autocorrelator.

In the simplest embodiment of the differential autocorrelator, the beam emerging from the test arm of a conventional autocorrelator after wavefront division can be thought of as being further split into two equal components with a wavefront divider. The result is a conventional autocorrelator with an additional arm. Therefore, as shown in FIG. 4, a beam is generated by a laser device 501 or the like and split by beamsplitter 502. A portion of the beam travels along reference path d3, reflected by retroreflector 503. The beams in the two other paths (d1) and (d4) are emitted at the same instant of time from beamsplitter 502. Then, the beams in paths d2 and d5 are emitted from beam transmitting devices (lenses) 504 and 505, respectively. Hence, rather than indexing the paths (d1+d2) and (d4+d5) against reference arm path d3, it is now possible to index (d1+d2) directly against (d4+d5).

The portions of beams d2 and d5 reflected from surfaces S1 and S2 are collected by lenses 504 and 505, respectively, and are provided to a timegating device 506 via (combiner) 502. The resulting signal is provided to detection device 507.

Figure 5A:
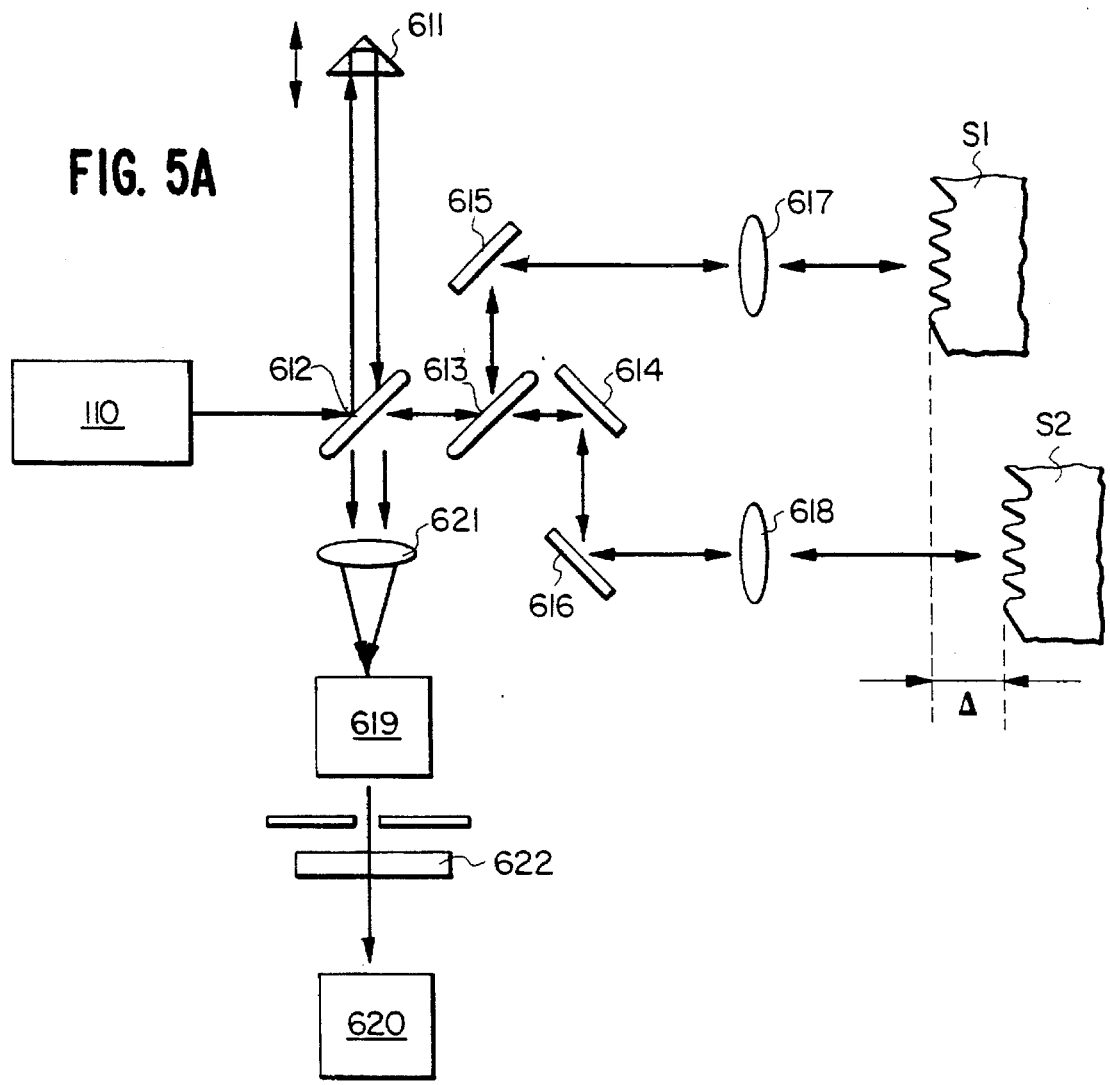
FIG. 5A illustrates a schematic implementation of beam-splitting protocol in the differential autocorrelator.
Figure 5B:
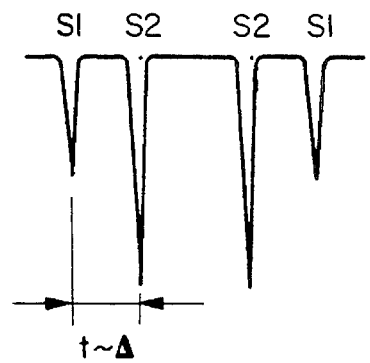
FIG. 5B illustrates typical autocorrelation signals, where the vertical axis indicates autocorrelation intensity.

FIG. 5 illustrates an implementation of the system schematically shown in FIG. 4. The amplitude division device 502 in FIG. 4 is realized in FIG. 5A as a pair of nonpolarizing plane beam splitters (612 and 613) and plane mirrors (614, 615 and 616). One of the components split off from 612 is retroreflected from a corner-cube or retroreflector 611 onto 612. In this process, the beam undergoes lateral displacement with respect to the incident laser beam as it arrives at 612. Retroreflector 611 is dithered repetitively on a mechanized actuator so that the reference optical path length oscillates with respect to a mean reference position. The other component of the beam is further divided at 613 and the resulting divided beams are separately launched at the test objects.

The beam transmitting devices 504 and 505 comprise convex lenses (617 and 618) of focal length 14cm each, that focus the test beam onto test surfaces S1 and S2 whose differential position needs to be measured. The number of objects to be ranged need not be confined to two. Amplitude division can be performed to yield as many spatially separate components as practicable, as long as the spatial separation of the components can be well defined, and as long as the individual components can be identified. Recombination of the collected signal occurs at 613, and recombination with the reference beam occurs at 612. The scatter from both arms is imaged onto the nonlinear time gate 619 by lens 621 of focal length 2.8 cm to produce as tightly focused a spot as possible therein. As before, a preferred implementation of 619 is a frequency-doubling SHG crystal, and 620, the detection unit, is realized as a photomultiplier tube preceded by appropriate filters 622. The differential autocorrelation trace is shown in the inset in FIG. 5B.

Figure 6A:
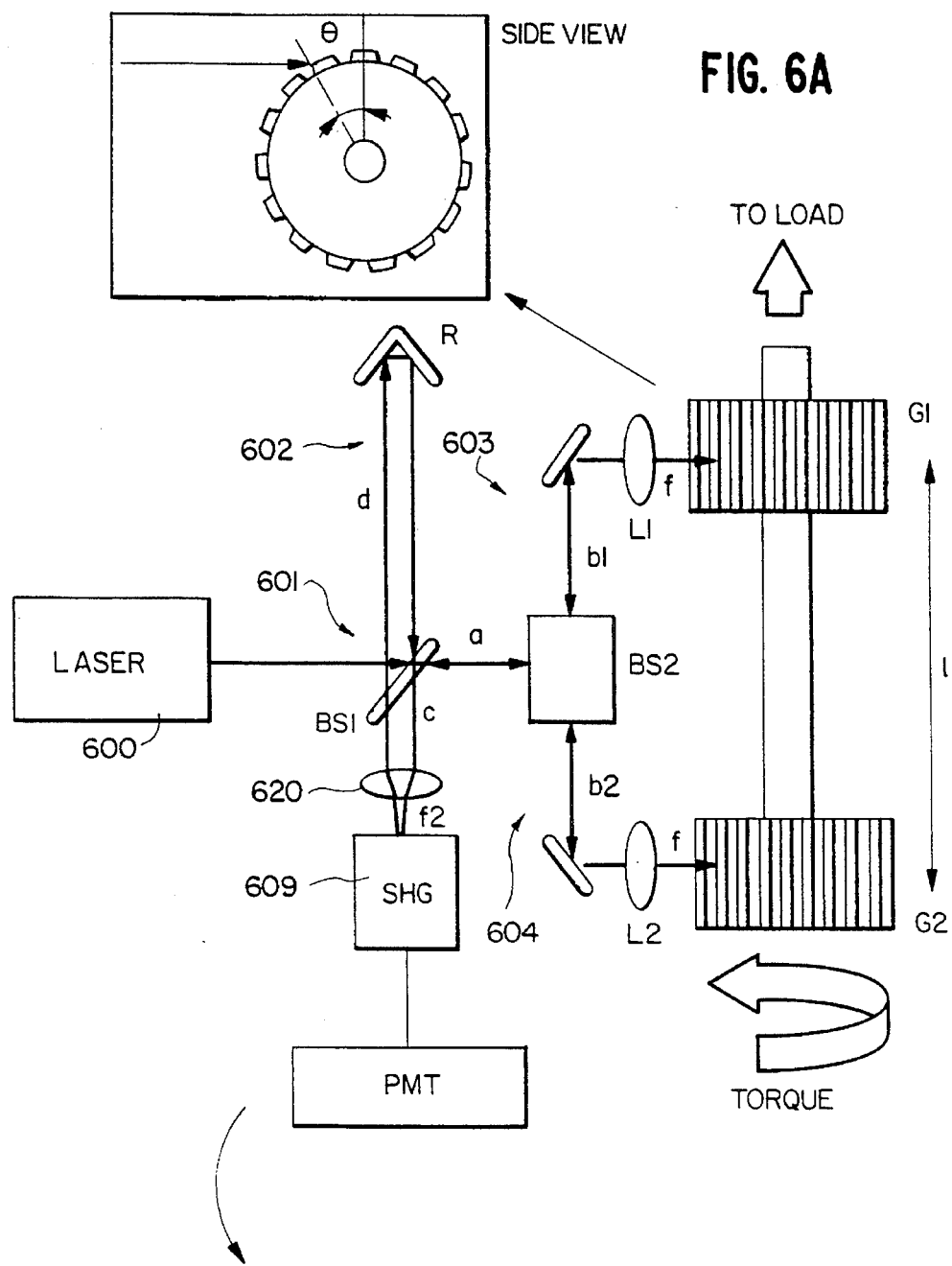
FIG. 6A shows the layout of components for the measurement of torque and horsepower using an autocorrelator comprising a beamsplitter that feeds variable reference and test arms.
Figure 6B:
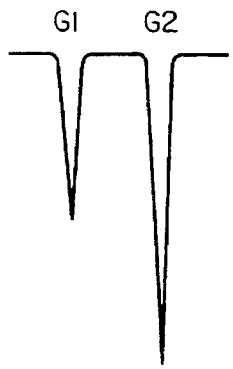
FIG. 6B illustrates examples of signals received from spur gears G1 and G2.

FIG. 6A illustrates an embodiment of the invention where the ranging technique described above is applied to the measurement of a torque imposed upon a rotary shaft. In this embodiment of differential correlation, torque is measured utilizing the axial flexing of the shaft transmitting the torque. The torsion is converted into displacement along an arc of an object such as a gear mounted on the shaft. The differential measurement of displacements of two gears at two differential points on the shaft provides a measure of the applied torque. The technique is especially useful for real time noncontact measurement on a shaft actually rotating and simultaneously transmitting torque.

The autocorrelator includes a beamsplitter for variable reference (602) and test (603, 604) arms, an ultrafast laser source 600 generating pulses with widths typically in the tens of femtoseconds and a nonpolarizing beamsplitter BS1 splitting the laser beam into two equal amplitude components. Light from the reference arm is retro-reflected back to the beamsplitter. The optical path length of the reference arm can be varied with a periodic function, performing path delay excursion larger than the differential displacements of the test objects.

The other half of the laser beam passes through the beamsplitter and is thereafter split into two beams b1 and b2 via a beamsplitter BS2. Each of the beams b1 and b2 impinges on each of two spur gears G1 and G2 mounted on a shaft transmitting the torque. Light scattered from the front of a tooth on the gear is collected by lenses L1 and L2 of focal length f, and coupled back into the paths b1 and b2.

The incident beam strikes the front surface of a tooth on the gear at an optimum height from the axis of the shaft such that the scatter back into L1 or L2 is maximum. The scattered signal is recombined in BS2 and propagated back to BS1. The return from the two arms are therefore rendered parallel to each other with a lateral displacement between the beams. Thereafter they are focussed into a nonlinear crystal 609, which produces nonlinear frequency doubling of the incident light. The functional form of the intensity of the doubled light in time is the autocorrelation of the envelope functions of the pulses contributing to the doubled light. When all three arm lengths are perfectly matched, and when the nonlinear crystal is appropriately phase-matched for doubling, three spots of blue light emerge from the crystal: the central spot contains the desired intensity autocorrelation, and is detected with a photomultiplier.

Lenses L1 and L2 have sufficiently long focal lengths that the depth-of-focus covers the estimated range of the displacements of the test surfaces. For optimum autocorrelation signal, tight focusing into the nonlinear crystal dictates that a+b1(2)+c≈f+f2, where f2 is the focal length of lens 620.

The separation between the autocorrelation signals in time from each of the two test arms is a differential measure of their relative position along the direction of propagation of the two laser beams. This measurement can be performed electronically by a time-delay counter that detects the two peaks and outputs the time delay between the two pulses. This time delay divided by the autocorrelation width of the laser pulse provides the relative separation in terms of the laser pulsewidth.

A measurement of the autocorrelation width of one of the signals specifies the relative separation between the teeth on the two gears in terms of the laser pulsewidth, which is known. Two loose conditions have to be satisfied for the appearance of the autocorrelation signals: b1≈b2, and d≈a+b1. Since this is a relative measurement, the absolute value of the arm d is immaterial.

The measured angular separation between the gears at any instant in time is a measure of the torque transmitted through the shaft. Assuming that the separation for zero torque is zero, the measured displacement upon application of torque is related to the magnitude of the torque by the following relationship:

$$\Delta \approx \frac{584Tld^3}{D^4G}$$

where $\Delta$ is the tangential displacement of the tooth on one gear with respect to the associated tooth on the other gear, T is the torque, l is the axial separation between the two gears, d is the radius of the gear, D is the diameter of the shaft, and G is the torsional modulus of elasticity of the material of the shaft. All units are in FPS.

The system of the invention can also be used to measure instantaneous angular velocity and horsepower. The autocorrelation trace is monitored continuously in time with respect to some periodic reference point. The most convenient synchronization parameter is the waveform driving the reference arm. The rate of change of position of the signal from one of the gears, e.g., G1, with respect to this synchronization reference is a measure of the angular velocity. This rate of change can be continuously calculated by measuring the change in angular displacement and dividing it by the time interval. For every pass of the reference arm, this quantity can be updated, so that a simultaneous measurement of torque as well as angular velocity results. The product of the instantaneous torque and the instantaneous angular velocity yields instantaneous horsepower. An apparatus as described above, suitably mounted on, e.g., an automobile engine, could thereby be used to give indication to the automobile operator of the output horsepower at any given instant in time, or to provide this variable to automated control units on the vehicle.

Due to the sensitivity of the autocorrelation technique, the scatter from the "native" surface under test is sufficient to obtain an autocorrelation signal. Therefore, the technique of the invention obviates the need for a reflective surface, special reflective coatings or retroreflector elements attached to the surface. Even surface roughness is tolerated. Cleanliness of the surface is not necessary, allowing for grease, dirt, oil films, etc. on the surface, which would necessarily be the case in the gearing system described above. Since there is no requirement for interferometric alignment of any component, the system is immune to vibration, shock and thermal stress. Alignment is simple and intuitive, and the data is conveniently accessible in a usable format.

Figure 7A:
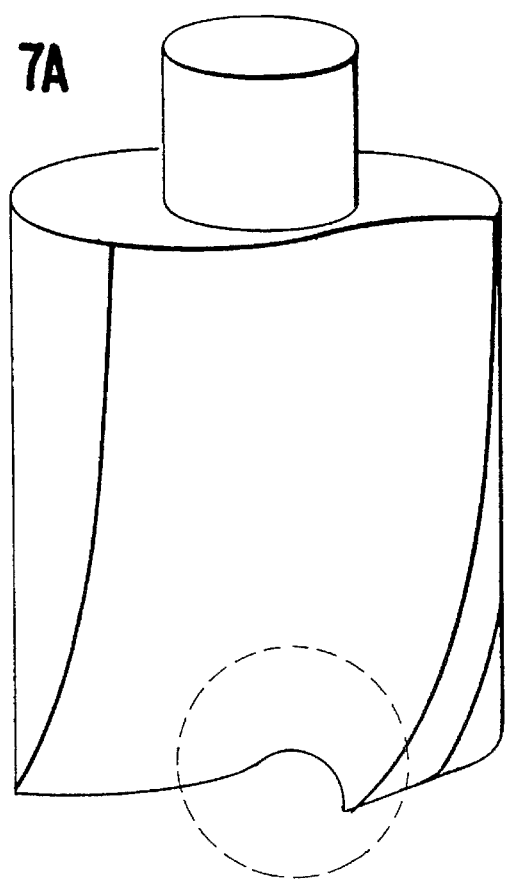
FIG. 7A shows deformation of the cutting edge of a tool due to stress.
Figure 7D:
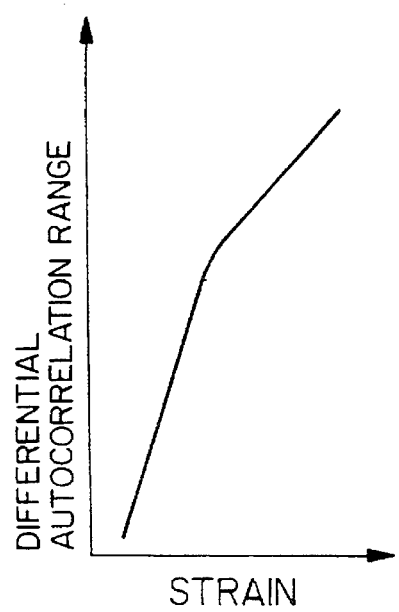
FIG. 7D shows a exemplary plot of the differential autocorrelation range against the internal strain as determined from the probe beams in FIGS. 7B and 7C.

According to another embodiment of the invention, stress on an elastically deformable object can be measured by a differential measurement of the deformation. For example, FIG. 7A shows deformation of the cutting edge of a tool due to stress, while FIG. 7D shows a strain curve of the object in FIG. 7A. If the geometry of the piece along with the Youngs/shear/flexure modulus of the material is known, a real time measurement of the deformation could provide information about fatigue and imminent failure of the material. For instance, fatigued rotor blades of steam turbines, jet engines, torque converters in automatic transmissions or turbocharger in automobile intake manifolds could result in catastrophic situations. Another such case is a fatigued or overloaded high speed machine tool. However, conventional strain sensors for rotor blades are very difficult to use reliably in their attendant hostile environments. The attaching of a strain sensor to each blade and the multiplexing of a battery of sensors to a measurement unit can prove to be prohibitively expensive. Conventional optical techniques such as interferometry fail because of the high scatter and attenuation under these conditions. Holographic techniques require pulsed high-power lasers with carefully controlled mode profiles, and data from these tests has to be acquired photographically, reducing the usefulness of the technique as a real-time diagnostic. Also, these techniques are not immune to scatter and time-varying refractive index gradients typical of a combustion chamber of a turbine engine.

The differential correlation technique is ideally suited to these situations because of its high spatial resolution, high sensitivity and immunity to scatter in the optical path.

Figure 7B:
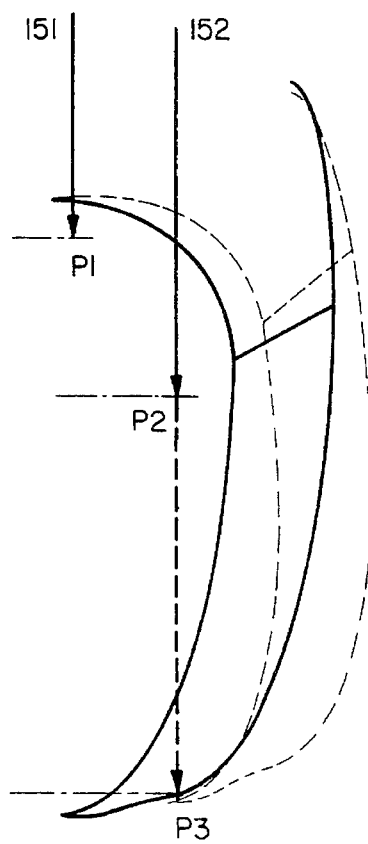
FIG. 7B shows probe beams being radiated on a stressed object.
Figure 7C:
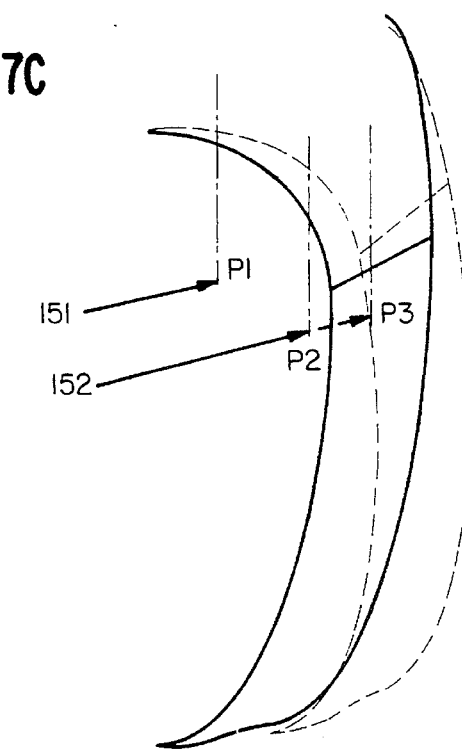
FIG. 7C shows probe beams being radiated on a stressed object.

The basic setup of the optics is as shown in FIG. 6A. Two test beams 151 and 152, as shown in FIG. 7B and C, from the two differential test arms of the correlator are directed to the tool body. In the case of a machine tool, this is the body of the cutting tooth, as shown. P1 and P2 are the points probed or detected on the unstressed body. Scatter is collected in the usual manner. Upon applying stress, point P2 on the tooth moves to a new position P3 such that beam 152 now hits the tooth at this location. P1–P2 and P1–P3 are proportional to strain in the two conditions, which can then be directly measured from knowledge of other parameters of the tool, as discussed above. FIGS. 7B and 7C demonstrate two different orientations of the probe beams to obtain information along two directions. Through this technique, a measure of the instantaneous strain present in the tool can be obtained, and compared against preset values indicative of imminent failure of the tool, to obtain an advance indication of failure.

A typical plot of the differential autocorrelation range against the internal strain is presented in FIG. 7D.

Figure 9A:
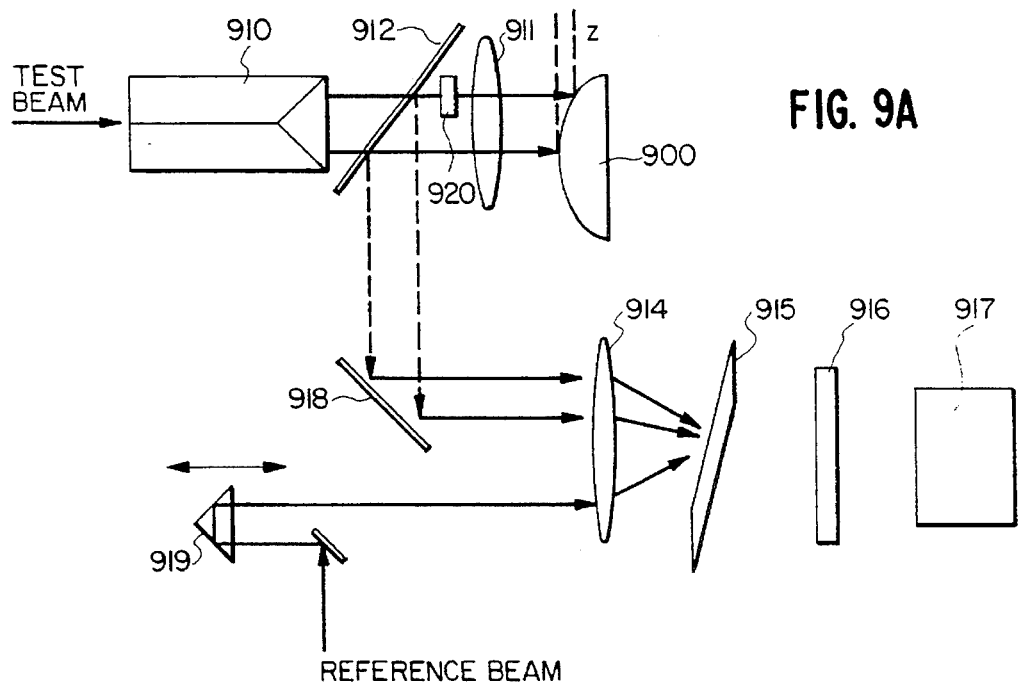
FIG. 9A. shows measurement of lateral velocity, and a pair of surface profiles employing a scheme for step-and-repeat profiling of a test surface using differential autocorrelation.
Figure 8:
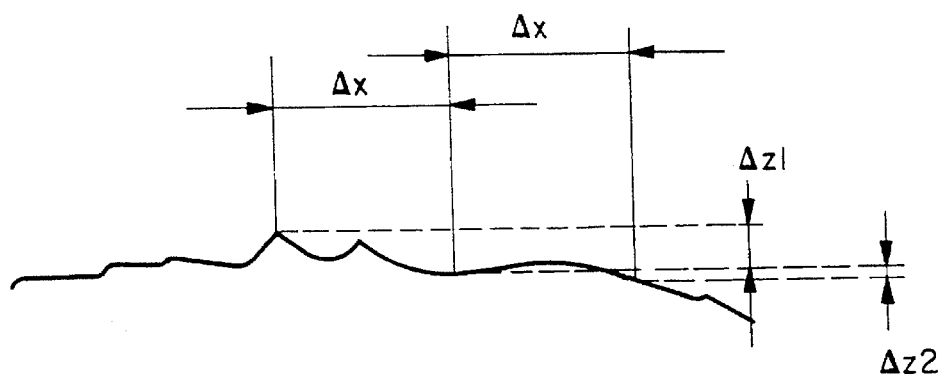
FIG. 8. is a schematic illustrating an example of a surface whose shape is modified by a machining process and on which real-time measurement of the local profile of the surface is measured.
Figure 9B:
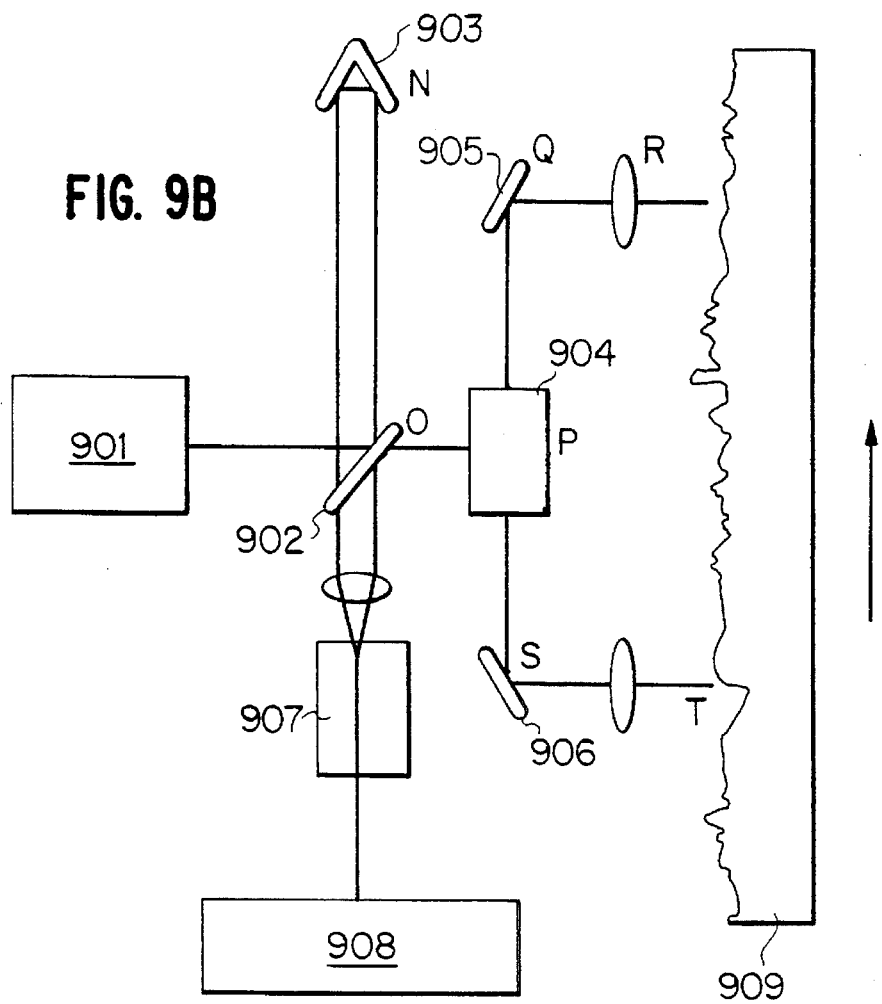
FIG. 9B illustrates another embodiment of the present invention for measuring lateral velocity in real time to determine a surface profile of an object.
Figures 9C, 9D, 9E:
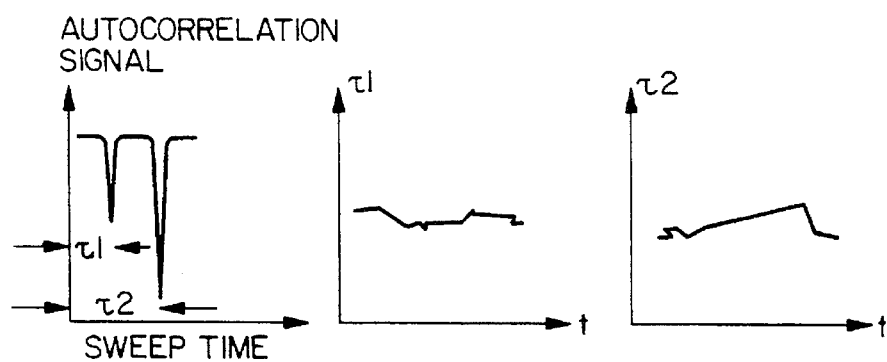
FIG. 9C illustrates timing and data acquisition as performed by the embodiment shown in FIG. 9B.
FIG. 9D shows surface profile data τ1 acquired by the embodiment shown in FIG. 9B.
FIG. 9E shows surface profile data τ2 acquired by the embodiment shown in FIG. 9D.

A further embodiment of the invention is shown in FIGS. 8 and 9. In this embodiment, the system of the invention is used to obtain real-time measurement of the local profile of a surface whose shape is being modified by a machining process. This technique is useful in the fabrication of various objects, including specialty optics, precision cams, etc. The availability of an accurate step-and-repeat process enables the surface characteristics of an object to be raster scanned to produce a surface profile. FIGS. 8, 9A, 9B, 9C, 9D and 9E illustrate this concept.

In FIG. 9A, 900 is a test surface whose profile is to be measured. The two probe beams from two test arms of the differential correlator shown in FIG. 6A, are directed to the surface 900. $\Delta x$, a scan translation distance shown in FIG. 8, is known from the geometry of the correlator. $\Delta z1$ is measured by differential autocorrelation. Thereafter, the probe beams are translated by the same distance $\Delta x$ such that in the new position, the first beam takes the prior position of the second beam, and the second beam previously at the second position takes a third position (see FIG. 8). $\Delta z2$ is measured, and so on until the desired surface has been scanned. A plot of the differential displacements with respect to the horizontal displacement gives the surface profile.

FIG. 9A illustrates use of the system in the step-and-repeat profiling of a test surface using differential autocorrelation. A Wollaston prism 910 separates the incident beam into two beams spaced apart by an amount determined by the geometry of the prism. Typically this separation is about 2 mm. The beam pair is launched through the beamsplitter 912 and a focusing lens 911 onto the surface. Scatter from the two spots is imaged using the imaging lens pair 911, 914 into the nonlinear time gating device, such as doubling crystal 915. Each spot focused onto the lens is focused back as an independent beam in the doubling crystal. Thereafter, this signal is mixed with pulses from a reference source that incorporates a time delay with a right angle prism 919. The preferred frequency doubling geometry is noncollinear intersection of the reference and signal beams, for the reasons described above. The frequency-doubled signal appears along the bisector of the angle subtended by the signal and reference beams. In the present case, it is manifested as two beams of doubled light, present along with residual collinear frequency doubled components. These are filtered through colored glass sharp-cut filters 916 to eliminate the fundamental wavelength light, and detected by a photomultiplier tube or an avalanche photodiode 917. The timing difference between the signals from the two beams is a differential measure of the distance of one point on the lens with respect to the other measured perpendicular to the surface.

A piece of relatively high-refractive index material 920 has been inserted in one of the arms. This separates the signals from the two spots in time, and the corresponding optical path is subtracted from the measured differential signal. This step removes any possible ambiguity regarding the sign of the differential range. Since the separation of the beams parallel to the test surface is known, a step-and-repeat scan of the surface performed such that the step size is equal to the lateral separation between the two beams produces a surface profile in terms of one point of origin on the surface.

Another application of this concept permits the measurement of lateral velocity in real time. A surface profile can be obtained with an autocorrelator by moving the test surface and acquiring depth data. The optical path of the reference arm is swept as signal corresponding to a point on the surface is acquired. The surface is then advanced laterally to the direction of interrogation by a known distance, and the operation is repeated. A series of such points yields a surface profile. In this embodiment, the velocity of the surface perpendicular to the direction of measurement, as the surface moves in the direction indicated by the arrow, is the quantity of interest.

A differential autocorrelator with two test arms as in FIG. 6A is used for this measurement. A comparison of the surface maps created at both the probe arms at different points in time is performed: the time elapsed between acquisition of a data point at one arm and recognition of the same point at the other arm is measured. The lateral distance between the probe beams from the two autocorrelators is very precisely known, and therefore lateral velocity of the object can be calculated.

FIG. 9B illustrates this embodiment. Item 901 is an ultrafast laser source, and 902 and 904 are beam splitters. 903 is a retroreflector for varying the optical delay in the reference arm. 905 and 906 are mirrors, and 909 is the test surface. The scatter of the test beams is gathered by the lenses and correlated with the beam from the reference arm in the crystal 907, in the manner described in the previous embodiments, to yield two signal peaks as detected by detector 908.

According to the protocol described above, the beam from the test arm is split into two components (PQR and PST in FIG. 9B) to measure lateral velocity. One of the components has an optical path length greater than that of the other, i.e., PQR>PST, but the range of excursion of the reference arm NO is greater than either OPQR or OPST. In this manner, two signals from each of the arms is obtained spaced apart by $(PQR-PST)/c$ in time.

This removes confusion about which arm the signals originate from. The two signals can be electronically recorded and manipulated independently. The timing is performed as follows.

Timing is started as data acquisition begins as shown in FIG. 9C. After the lapse of an interval of time, the surface has moved forward and the first arm has acquired a surface profile ($\tau1$), as shown in FIG. 9D, corresponding to a fixed number of interrogation points on the surface. This profile is held in memory. Concurrently, the second autocorrelator captures its own surface profile data ($\tau2$) as shown in FIG. 9E. The features on the surface recorded from the maps between the two autocorrelators are constantly compared by electronic means.

After time T, a close match is found between the target surface map and the map created by the second autocorrelator. With T determined, the lateral velocity of the surface may be calculated.

A set of large FIFO (first-in—first-out) memory cells of any convenient word size can be used for the comparison process. The data from the first arm is fed to one cell of small fixed size, for example "m" words. The surface profile consisting of "m" sampling points is stored in cell #1 after acquisition until the next reset pulse. Concurrently, data points from the other arm are stored in cell #2. With each data point, a FIFO operation is performed of "m" words, and the second memory cell is subtracted from cell #1.

When the subtracted words in each of the cells is zero or some arbitrarily small quantity, a correlation is obtained between the two data sets. The corresponding time interval is read off, and used to calculate the lateral velocity. Alternatively, certain distinguishing features can be sought on parts of the surface, e.g. a sharp edge, point-by-point slope of the profile, etc. as variables to be electronically compared.

In another embodiment, precise measurements of a differential dimension on an object that is executing undesirable movements along the direction of ranging may performed. The differential nature of the measurement schema according to the invention will serve to cancel out this movement. For instance, most machining operations are performed using dimensioning that references an origin located on the workpiece itself. Precision machining techniques mostly utilize ranging devices (such as CW lasers etc.) that are mounted external to the workpiece, and therefore reference a fixed point in space relative to the workpiece. However, a ranging device that supplies real-time dimensional information to an automated machining tool is subject to vibrations of the workpiece being modified. The invention provides a differential ranging technique by which this problem can be eliminated.

In this technique, one of the arms of the differential correlator is referenced to a predetermined origin on the workpiece. The other arm interrogates the surface being machined. The differential distance ranged is the desired dimension. Vibrations along the direction of propagation of the probe beams affect the optical path length of both arms equally, and are thus canceled out.

In a further embodiment of the differential ranging device, the thickness of thin films of partially or fully transparent liquids on a surface can be ranged with submicron precision. With this scheme it is also possible to measure the thickness of many transparent layers of different immiscible liquids. Here, the test arm requires only one branch. Test laser pulses are launched at the liquid film being monitored. Scatter/reflections originate both due to the liquid surface and due to the liquid-solid interface, or the interface between two liquids as the case may be.

Each reflection can be time-gated and its signal detected. A small correction has to be added to the thickness of each layer of liquid thus calculated, since the refractive indices of the liquids might be unequal. The reflection from the solid surface is weaker than the one from the liquid-air interface. This can be effectively used to measure the thickness of, for example, a film of water or ice on asphalt.

The invention may also be embodied as a noncontact high resolution surface profilometer. Conventional surface profilometers utilize contact probes to locate the surface with respect to the probe head. Scanning of the contact probe on the surface is performed by stepper motors with micron-type resolution, and these motions are mechanically indexed with respect to mechanical origin locators by rotary encoders. The technique presented herein offers superior resolution compared to contact-probe type profilometers, but over and above this, provides comparable resolution along coordinates perpendicular to the direction of the surface probe. Due to the noncontact nature of this probe, surface damage from the measurement process is nonexistent.

Figure 10A:
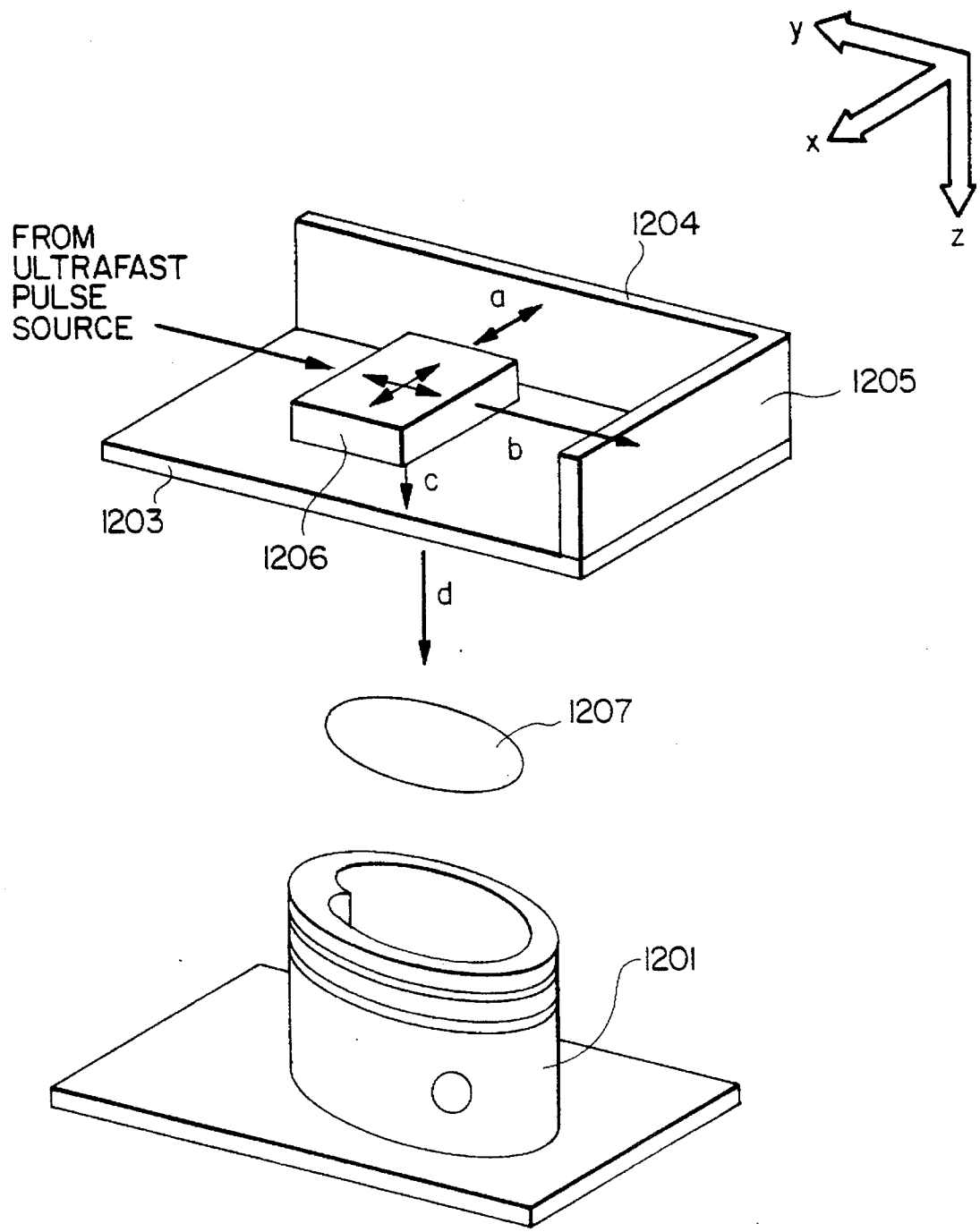
FIG. 10A illustrates an embodiment of a noncontact surface profile of the present invention.

FIG. 10A illustrates an embodiment of a noncontact surface profilometer of the present invention. Given a fixed frame of reference, the cartesian coordinates of a large number of points on this surface in this fixed frame of reference is desired. By scanning the values of the other two axes orthogonal to the z-direction in a raster fashion and continuously acquiring and storing data, a three-dimensional surface can be mapped out. As shown in the FIG. 10A, item 1201 is the object to be profiled, and the frame 1202 is placed over the object as a fixed frame of reference. This frame consists of one transparent precision optical flat 1203 and two half mirrored flats 1204 and 1205, all surfaces being perpendicular to each other.

Ultrashort optical pulses are incident upon a three-way beamsplitter that creates three perpendicularly propagating beams a, b and c of nearly equal intensity. Reflections from each of the reference surfaces as well as the scatter from the object surface are gathered and recombined.

Figure 10B:
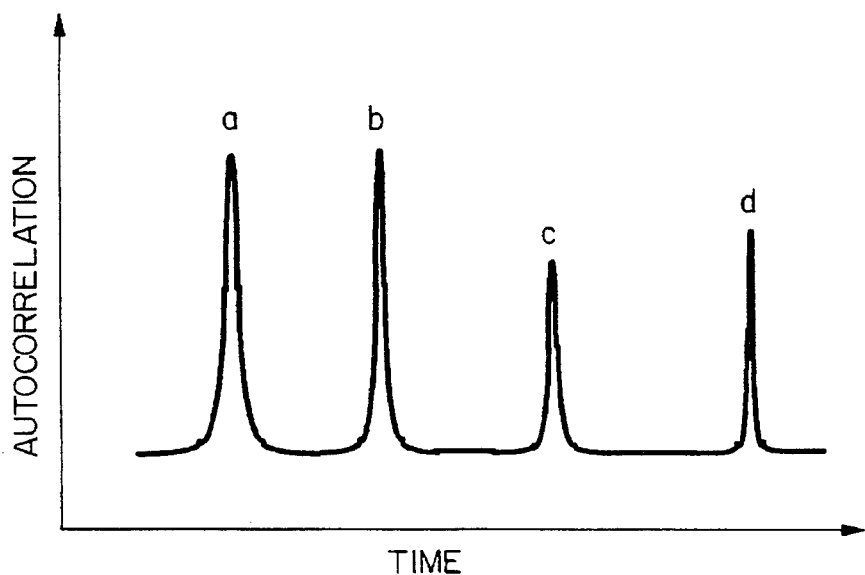
FIG. 10B shows autocorrelation data obtained from the apparatus shown in FIG. 10A.
Figure 10C:
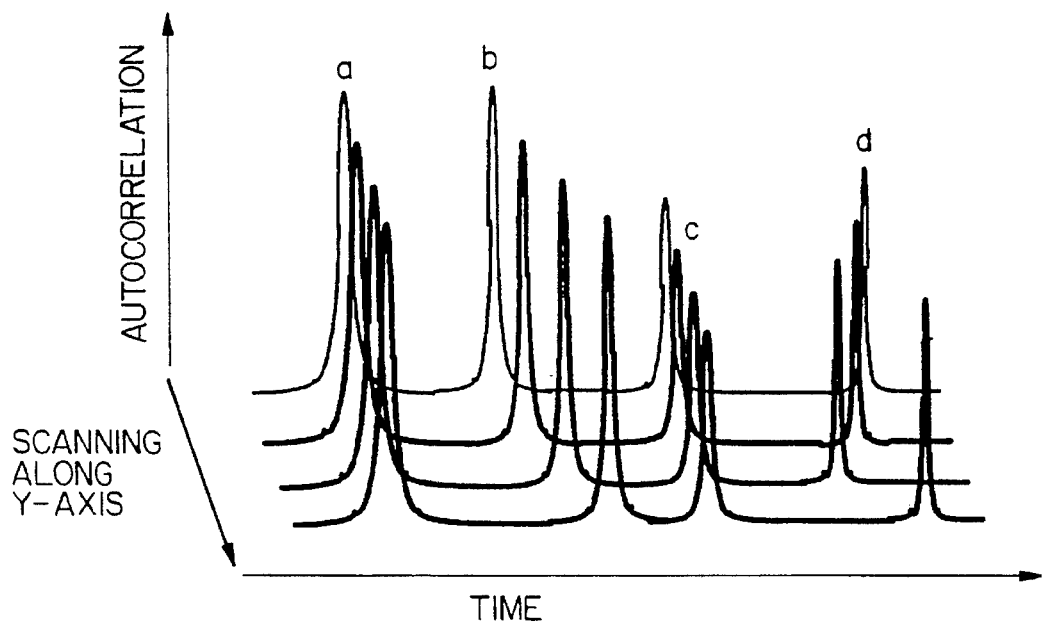
FIG. 10C shows 3-dimensional autocorrelation data obtained from the apparatus shown in FIG. 10A.

In this embodiment, the beamsplitter device also performs recombination. The signal thus obtained for a single point on the test surface is shown in FIG. 10B. Given the sensitivity and high signal-to-noise of the time-gating correlation technique, the scatter off the test surface is sufficient to generate an autocorrelation signal. Since c is an optical flat, the difference between c and d is a measure of the surface profile. The values a and b, available from the computer control signals to the translation stages, provide x and y cartesian coordinate axis information. This information can be translated into a 3-D surface grid as shown in FIG. 10C.

This unit straddled atop the reference plane constitutes the probe head. The probe head serves as the launching site of ultrashort probe pulses as well as the device for collecting scatter. However, it should be pointed out that the resolution of the motorized translation stages need not be on the micron-scale. The high-resolution indexing offered by the x and y beams provides precise position information not obtainable with conventional translation stages and indexing heads. Vibrations and flexure in the translation stages and attendant mounting hardware do not affect the accuracy of the scan, since all motions are indexed with respect to a rigid frame of reference completely mechanically isolated from the measurement system.

The dimensions of the optical flats used in the setup are larger than the excursions of the translation stages. The ultrashort pulse source and the correlator unit can be physically mounted on top of the translation stages. Alternatively, the pulse train from the source can be brought into the correlator externally, through a set of mirrors. The autocorrelator unit (the nonlinear crystal, focusing optics and detection devices) can be made compact enough to be mounted on the scanning head.

As discussed before, the tradeoffs inherent in the design of the signal collection optics are also valid here. Careful design of "passive" imaging systems can lead to depths of focus in the range of 1 cm. Alternatively, at the expense of data acquisition speed, an electronically controlled zoom lens system can be used to cover considerable depths of focus. A larger depth of focus leads to less constraints on the size of the test object, and therefore a more versatile object profile.

Although several exemplary embodiments have been herein shown and described, those of skill in the art will recognize that many modifications and variations are possible, and it is intended to measure the invention only by the appended claims.

What is claimed is:

1. An apparatus for measuring a differential positional deviation between at least a first object and a second object from a remote location, comprising:
   means for generating a light beam of ultrashort pulses;
   means for dividing said light beam into a plurality of light beams, including a reference beam;
   means for directing said light beams other than said reference beam to said objects;
   means for directing said reference beam along a defined optical path;
   means for collecting portions of said light beams reflected from said objects and for combining the reflected or scattered beams at a time gate, together with said reference beam;
   said time gate obtaining an autocorrelation function of said pulses, said function having maxima at time-separated locations corresponding to time of flight differences between said reflected beams; and
   detector means for determining a differential distance between said objects in response to said autocorrelation function.

2. An apparatus as claimed in claim 1, wherein said time gate comprises a non-linear frequency doubling crystal.

3. An apparatus as claimed in claim 1, wherein said defined optical path comprises a variable length path whose absolute length oscillates about a mean value.

4. An apparatus as claimed in claim 1, wherein said combining means directs said beams to said timegate in parallel fashion, and including means for overlapping said beams within said timegate.

5. An apparatus as claimed in claim 4, wherein said reference beam travels along a reference path of fixed length, and wherein said reflected beams travels along a measurement path having a length which varies with time.

6. An apparatus as claimed in claim 1, wherein said timegate comprises a non-linear frequency doubling crystal, which, when said reference beam and said reflected beams are applied thereto, produces an autocorrelation function of said beams having maxima at locations where said reflected beams are coincident in time with said reference beam.

7. An apparatus as claimed in claim 1, wherein said first and second objects are rotary members, and wherein said detector means determines a relative rotational phase difference between said rotary members.

8. An apparatus as claimed in claim 7, wherein said rotary members are gears commonly attached to a rotary shaft, and wherein said detector means determines an instantaneous torque applied to said shaft from said relative rotational phase difference.

9. An apparatus as claimed in claim 8, wherein said detector means determines an instantaneous angular velocity of either of said gears.

10. An apparatus as claimed in claim 9, wherein said detector means determines instantaneous horsepower of a power source driving said shaft from said torque and angular velocity values.

11. An apparatus as claimed in claim 1, wherein said first and second objects are portions of an integral deformable body subject to stress, and wherein said detector means determines a relative positional displacement between said portions, to obtain a measure of the instantaneous strain present in said deformable body.

12. An apparatus for profiling a surface of an object, comprising:
   means for generating a pulsed light beam;
   means for dividing said light beam into a plurality of spatially separate, parallel measurement light beams and a reference beam;
   means for directing said measurement light beams to said surface;
   means for scanning said measurement light beams across said surface;
   means for collecting portions of said measurement light beams reflected from said surface and combining said measurement light beams and said reference beam at a timegate providing an autocorrelation function of said beams; and
   means for measuring a differential distance between optical paths traveled by said measurement light beams, so as to obtain profile data on said surface.

13. An apparatus as claimed in claim 12, further comprising means for temporally delaying one of said measurement beams prior to said measuring means to remove sign ambiguity of said differential.

14. An apparatus as claimed in claim 13, wherein said scanning means has a step size equal to the lateral distance between said measurement beams.

15. An apparatus as claimed in claim 12, wherein said measuring means determines a velocity of movement of said surface by determining a time differential between times that said first and second measurement beams scan the same location.

16. An apparatus as claimed in claim 15, wherein said measuring means includes memory means for storing a first surface profile as detected by a first of said measurement beams, and comparing means for determining when a match exists between said first surface profile and a second surface profile as detected by a second of said measurement beams.

17. An apparatus for examining a laminar surface, comprising:

means for generating a pulsed light beam;

means for dividing said light beam into at least one measurement light beam and a reference beam;

means for directing said measurement light beam to said surface;

means for collecting portions of said measurement light beam reflected from different lamina of said surface and combining reflected portions of said measurement light beam and said reference beam at a timegate providing an autocorrelation function of said beams; and means for measuring a differential distance between the different optical paths traveled by said measurement light beam, so as to obtain data on at least the thickness of said surface lamina.

18. An apparatus for measuring a differential positional deviation between at least first and second portions of an object from a remote location, comprising:

means for generating a light beam of ultrashort pulses;

means for dividing said light beam into at least a measurement beam and a reference beam;

means for directing said reference beam to said first portion of said object, representing a reference portion;

means for directing said measurement beam to said second portion of said object;

means for collecting portions of said light beams reflected from said first and second portions and for combining the reflected beams at a time gate;

said time gate obtaining an autocorrelation function of said beams, said function having maxima at time-separated locations corresponding to time of flight differences between said reflected beams; and detector means for determining a differential distance between said first and second portions, independently of any conjoint movement of said first and second portions.

19. A method for measuring a distance to an object, comprising the steps of:

generating a light beam of ultrashort pulses;

dividing said light beam into a plurality of light beams, including at least two measurement beams and a reference beam;

directing said measurement beams to said object; and collecting portions of said measurement beams reflected from said object and combining said reflected beams and said reference beam at a time gate which provides an autocorrelation function of said beams; and measuring a differential distance in optical path traversed by said respective light beams.

20. A method as claimed in claim 19, wherein said combining step comprises combining and coincidently focusing said portions of said reflected light beams and said reference beam in a nonlinear frequency doubling optical crystal.

21. An apparatus for determining the coordinates of a point on an object in a given Cartesian frame of reference from a remote location, comprising:

means for generating a light beam of ultrashort pulses;

means for dividing said light beam into a plurality of measurement beams and a reference beam;

means for respectively directing said beams toward coordinate reference planes and said object;

means for collecting portions of said light beams reflected from said object and said reference planes and for combining the reflected beams at a time gate;

said time gate obtaining an autocorrelation function of said beams, said function having maxima at time-separated locations corresponding to time of flight differences between said reflected beams; and detector means for determining X and Y coordinates from at least the beams reflected from said coordinate reference planes, and for determining a Z coordinate from at least the beam reflected from said object.

22. An apparatus as claimed in claim 21, further comprising means for scanningly translating at least said dividing means in said X and Y directions, so that said detector means obtains multiple measurements of said Z coordinate to effect a mapping of the surface of said object.

23. An apparatus as claimed in claim 22, wherein said scanning translation is optically indexed using at least one component of said autocorrelation function.

24. An apparatus as claimed in claim 21, wherein said timegate comprises a frequency doubling non-linear optical crystal.

25. An apparatus as claimed in claim 21, wherein said collecting means comprises a zoom lens having a large depth of focus.

26. An apparatus as claimed in claim 21, further comprising an optical flat arranged between said beam divider and said object, whereby the beam directed toward and reflected from said object passes through said optical flat and is also reflected therefrom, and wherein said Z coordinate is measured by differencing components of said autocorrelation function derived from the beam reflected by said object and the beam reflected by said optical flat.

* * * * *